United States Patent
Taketomi (10) Patent No.: US 10,742,914 B2
(45) Date of Patent: Aug. 11, 2020

(54) HEAD-WEARABLE IMAGING APPARATUS WITH TWO IMAGING ELEMENTS CORRESPONDING TO A USER LEFT EYE AND RIGHT EYE, METHOD, AND COMPUTER READABLE STORAGE MEDIUM FOR CORRECTING A DEFECTIVE PIXEL AMONG PLURAL PIXELS FORMING EACH IMAGE CAPTURED BY THE TWO IMAGING ELEMENTS BASED ON DEFECTIVE-PIXEL RELATED POSITION INFORMATION

(71) Applicant: CANON KABUSHIKI KAISHA, Tokyo (JP)

(72) Inventor: Yuzo Taketomi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/917,412

(22) Filed: Mar. 9, 2018

(65) Prior Publication Data
US 2018/0270431 A1    Sep. 20, 2018

(30) Foreign Application Priority Data
Mar. 17, 2017    (JP) .................................. 2017-052547

(51) Int. Cl.
| | |
|---|---|
| *H04N 5/367* | (2011.01) |
| *H04N 5/372* | (2011.01) |
| *H04N 5/374* | (2011.01) |
| *H04N 5/225* | (2006.01) |
| *H04N 5/232* | (2006.01) |
| *G02B 27/01* | (2006.01) |

(52) U.S. Cl.
CPC ............ *H04N 5/367* (2013.01); *G02B 27/017* (2013.01); *H04N 5/2258* (2013.01); *H04N 5/23293* (2013.01); *H04N 5/372* (2013.01); *H04N 5/374* (2013.01); *G02B 2027/0138* (2013.01); *G02B 2027/0178* (2013.01)

(58) Field of Classification Search
CPC ...... H04N 5/367; H04N 5/3675; H04N 5/372; H04N 5/374; H04N 5/23293; G06T 7/0002; G02B 27/01; G02B 27/017; G02B 2027/0178; G02B 2027/0138
USPC .......................................... 348/115, 246, 247
See application file for complete search history.

(56) References Cited

U.S. PATENT DOCUMENTS 6,515,285 B1 *  2/2003  Marshall ................... G01J 5/20
                                                             250/339.03
6,819,358 B1 * 11/2004  Kagle ...................... H04N 5/367
                                                                 348/187

(Continued)

FOREIGN PATENT DOCUMENTS

JP        2010-154536 A       7/2010

*Primary Examiner* — Twyler L Haskins
*Assistant Examiner* — Akshay Trehan
(74) *Attorney, Agent, or Firm* — Canon U.S.A., Inc. IP Division (57) ABSTRACT

An apparatus for reading data of a plurality of pixels as a unit, and includes a storage unit configured to store defective-pixel related information in the unit of the plurality of pixels, a readout unit configured to read out the defective-pixel related information, and a correction unit configured to correct a defective pixel among the plurality of pixels based on the defective-pixel related information.

18 Claims, 9 Drawing Sheets

(56) References Cited

U.S. PATENT DOCUMENTS

| | | | | |
|---|---|---|---|---|
| 7,061,533 B1* | 6/2006 | Urushiya | ............... | G01N 23/04 |
| | | | | 348/346 |
| 8,089,538 B2* | 1/2012 | Kitani | ................ | H04N 5/23245 |
| | | | | 348/220.1 |
| 2008/0278609 A1* | 11/2008 | Otsuki | ................. | H04N 5/2178 |
| | | | | 348/247 |
| 2013/0128082 A1* | 5/2013 | Kiyosawa | ............ | H04N 5/2178 |
| | | | | 348/246 |
| 2013/0229550 A1* | 9/2013 | Nakao | .................... | H04N 5/367 |
| | | | | 348/247 |
| 2013/0265295 A1* | 10/2013 | Ogawa | .................. | G09G 5/003 |
| | | | | 345/214 |
| 2014/0063055 A1* | 3/2014 | Osterhout | ............... | G06F 3/005 |
| | | | | 345/633 |
| 2014/0192237 A1* | 7/2014 | Ikedo | .................... | H04N 5/367 |
| | | | | 348/246 |
| 2015/0103200 A1* | 4/2015 | Vondran, Jr. | ......... | H04N 13/133 |
| | | | | 348/223.1 |
| 2015/0116566 A1* | 4/2015 | Yamamoto | ............. | H04N 5/367 |
| | | | | 348/308 |
| 2015/0288935 A1* | 10/2015 | Shinozaki | ............ | H04N 5/2176 |
| | | | | 348/322 |
| 2017/0126999 A1* | 5/2017 | Elikhis | ................. | H04N 5/3658 |
| 2017/0318244 A1* | 11/2017 | Koskinen | ............. | H04N 5/367 |
| 2018/0288316 A1* | 10/2018 | Shionoya | ........... | H04N 9/04515 |

* cited by examiner

| ADDRESS | BAYER Y COORDINATE[10:0] | BAYER X COORDINATE[10:0] | DEFECTIVE PIXEL FLAG[3:0] |
|---|---|---|---|
| 0 | 0 | 1 | 1000(BINARY NOTATION) |
| 1 | 1 | 2 | 1010(BINARY NOTATION) |
| 2 | 2 | 3 | 0111(BINARY NOTATION) |
| ... | 0 | 0 | 0000(BINARY NOTATION) |
| 8191 | 0 | 0 | 0000(BINARY NOTATION) |

|   |   | R1 |   |   |
|---|---|----|---|---|
|   |   |    |   |   |
| R2|   | R0 |   | R3|
|   |   |    |   |   |
|   |   | R4 |   |   |

FIG. 6B

|   |   | B1 |   |   |
|---|---|----|---|---|
|   |   |    |   |   |
| B2|   | B0 |   | B3|
|   |   |    |   |   |
|   |   | B4 |   |   |

FIG. 6C

|    |    | G5 |    |    |
|----|----|----|----|----|
|    | G1 |    | G2 |    |
| G6 |    | G0 |    | G7 |
|    | G3 |    | G4 |    |
|    |    | G8 |    |    |

FIG. 8

| ADDRESS | BAYER Y COORDINATE [10:0] | BAYER X COORDINATE [10:0] | DEFECTIVE PIXEL FLAG [3:0] | RIGHT AND LEFT DISCRIMINATION |
|---|---|---|---|---|
| 0 | 0 | 1 | 1000(BINARY NOTATION) | 11 |
| 1 | 1 | 2 | 1010(BINARY NOTATION) | 01 |
| 2 | 2 | 3 | 0111(BINARY NOTATION) | 10 |
| ... | 0 | 0 | 0000(BINARY NOTATION) | 11 |
| 8191 | 0 | 0 | 0000(BINARY NOTATION) | 01 |

HEAD-WEARABLE IMAGING APPARATUS WITH TWO IMAGING ELEMENTS CORRESPONDING TO A USER LEFT EYE AND RIGHT EYE, METHOD, AND COMPUTER READABLE STORAGE MEDIUM FOR CORRECTING A DEFECTIVE PIXEL AMONG PLURAL PIXELS FORMING EACH IMAGE CAPTURED BY THE TWO IMAGING ELEMENTS BASED ON DEFECTIVE-PIXEL RELATED POSITION INFORMATION

BACKGROUND OF THE INVENTION

Field of the Invention

The aspect of the embodiments relates to an imaging apparatus, a correction method for a defective pixel, and a computer readable storage medium.

Description of the Related Art

In recent years, an imaging apparatus with a charge coupled device (CCD) image sensor or a complementary metal oxide semiconductor (CMOS) image sensor has been widely used. It is known that these image sensors can have a defective pixel, which cannot be correctly output due to a factor, such as a defect in a semiconductor. Occurrence of the defective pixel causes degradation in image quality. It is desirable that no defective pixel be present from the viewpoint of image quality. However, in general, it is difficult to remove all defective pixels of an image sensor. Against this backdrop, in general, a defective pixel is detected and corrected in an imaging apparatus. Specifically, a defective pixel is detected beforehand in a process such as a manufacturing process, and position information about the defective pixel is stored into a storage device, such as a buffer or a memory, of the imaging apparatus. This position information is then actually used as follows. First, the imaging apparatus identifies the defective pixel based on the position information about the defective pixel. The imaging apparatus corrects the identified defective pixel by replacing this defective pixel with an average value of a plurality of pixels adjacent to the defective pixel.

Meanwhile, an imaging apparatus capable of simultaneously reading a plurality of pixels has been available to prevent a speedup of a pixel clock due to resolution enhancement of a recent image sensor. In general, such an imaging apparatus is accompanied by an increase in the number of defective pixels due to resolution enhancement, and parallelization of processing due to simultaneous reading of the plurality of pixels. The increase in the number of defective pixels leads to an increase of an amount of memory in use for storing position information about a defective pixel. The parallelization of processing also has such a situation that a circuit scale increases because a circuit is necessary for each parallel processing. In view of these situations, Japanese Patent Application Laid-Open No. 2010-154536 discusses a configuration for reducing a memory size, by forming position information about a defective pixel by using defective pixel coordinates and adjacent defective pixel flag information of 2 bits.

SUMMARY OF THE INVENTION

An apparatus for reading data about a plurality of pixels as a unit, and includes a storage unit configured to store defective-pixel related information in the unit of the plurality of pixels, a readout unit configured to read out the defective-pixel related information, and a correction unit configured to correct a defective pixel among the plurality of pixels based on the defective-pixel related information.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the drawings.

Figure 1:
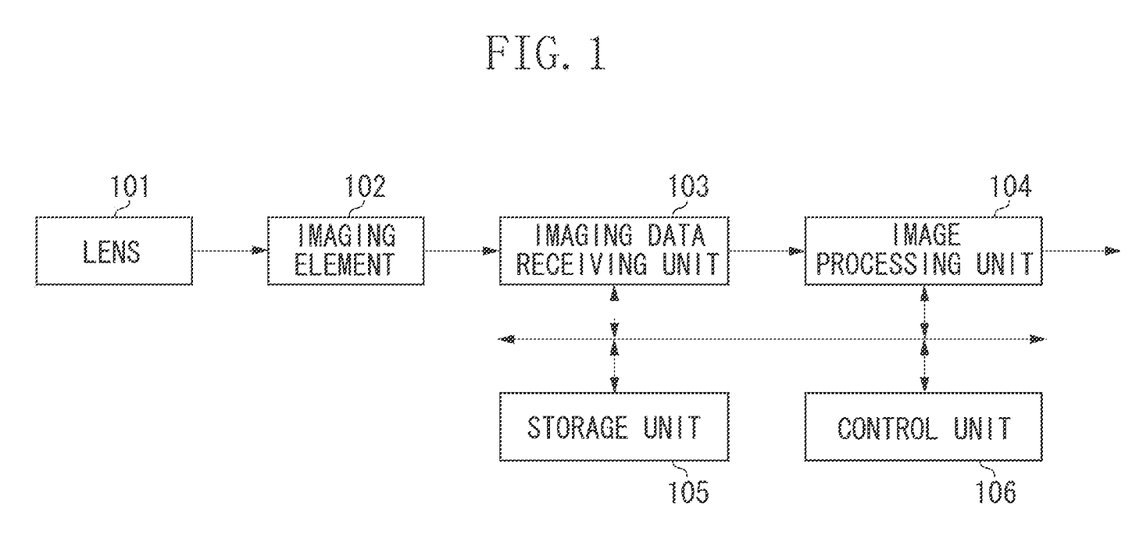
FIG. 1 is a diagram illustrating an example of a configuration of an imaging apparatus.

A first exemplary embodiment of the disclosure will be described below in detail. FIG. 1 is a diagram illustrating an example configuration of an imaging apparatus according to the present exemplary embodiment. In FIG. 1, the imaging apparatus includes a lens 101, an imaging element 102, an imaging data receiving unit 103, an image processing unit 104, a storage unit 105, and a control unit 106.

The lens 101 collects incident light from a light source and light reflected from an object, and guides the collected light to the imaging element 102. The imaging element 102 has pixels arranged in a two-dimensional matrix. The imaging element 102 is configured to be capable of simultaneously reading data of four pixels (R/Gr/Gb/B) forming a unit of Bayer pattern (hereinafter, also simply referred to as Bayer pattern). The unit of pixels that can be simultaneously read may be a plurality of pixels other than the four pixels forming the unit of Bayer pattern. The unit of the pixels that can be simultaneously read includes two or more pixels, and examples thereof include two pixels adjacent in a horizontal direction or a vertical direction, and a pixel group of a multiple of the pixels forming the unit of Bayer pattern. The imaging element 102 converts brightness information about an object into an analog electric signal by performing photoelectric conversion, after performing exposure control on the light passing through the lens 101 by using a component, such as an electronic shutter. A color filter is disposed on a surface of the imaging element 102. The imaging element 102 can thus also acquire color information about the object. Subsequently, the electric signal is subjected to analog-to-digital conversion (A/D conversion), and then output as a digital electric signal (image data). The imaging data receiving unit 103 receives the image data from the imaging element 102. At the time, the imaging data receiving unit 103 may convert the format of a synchronizing signal of an image and buffer image data of a pixel to be simultaneously output from the imaging element 102, thereby changing the number of pixels into the number of pixels that can be easily processed by a processing unit in the following stage. The imaging data receiving unit 103 may output the image data thus processed. The image processing unit 104 performs various types of image processing on the image data output from the imaging data receiving unit 103. The image processing unit 104 includes a defect detection unit 200 illustrated in FIG. 2 (described below), and a defect correction unit 500 illustrated in FIG. 5 (described below). The storage unit 105 is a nonvolatile memory. The storage unit 105 stores data to be used in the image processing unit 104 and a program to be executed by a microcomputer in a case where the control unit 106 includes the microcomputer. The data to be used in the image processing unit 104 includes position information about a defective pixel. When the imaging apparatus is activated, the control unit 106 transfers the position information from the storage unit 105 to a defective pixel information storage unit 205 of the defect detection unit 200 in the image processing unit 104. The control unit 106 performs control of the imaging data receiving unit 103 and the image processing unit 104, and loads the data stored in the storage unit 105 into the corresponding processing unit.

Figure 2:
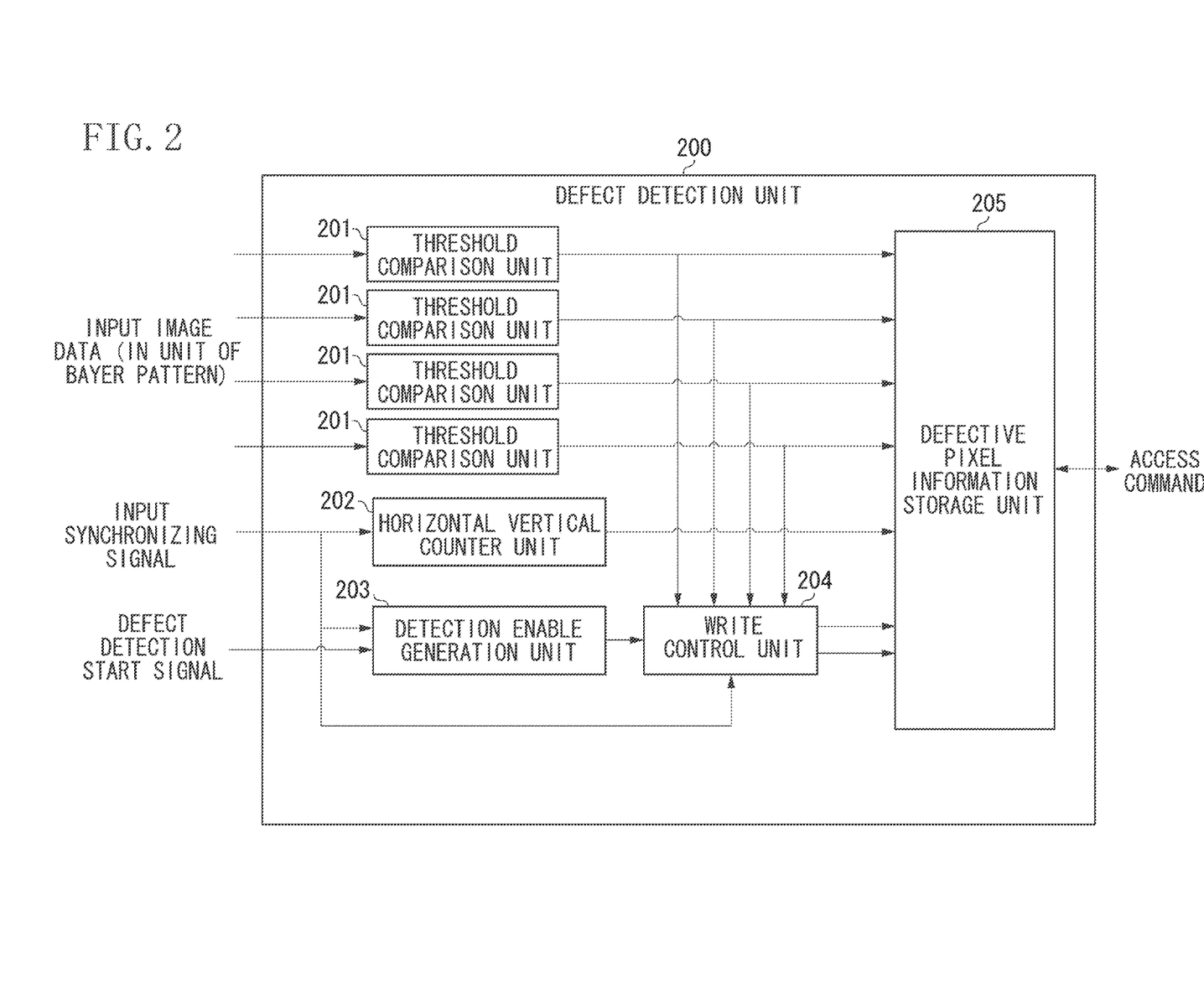
FIG. 2 is a diagram illustrating an example of a configuration of a defect detection unit.
Figure 3A:
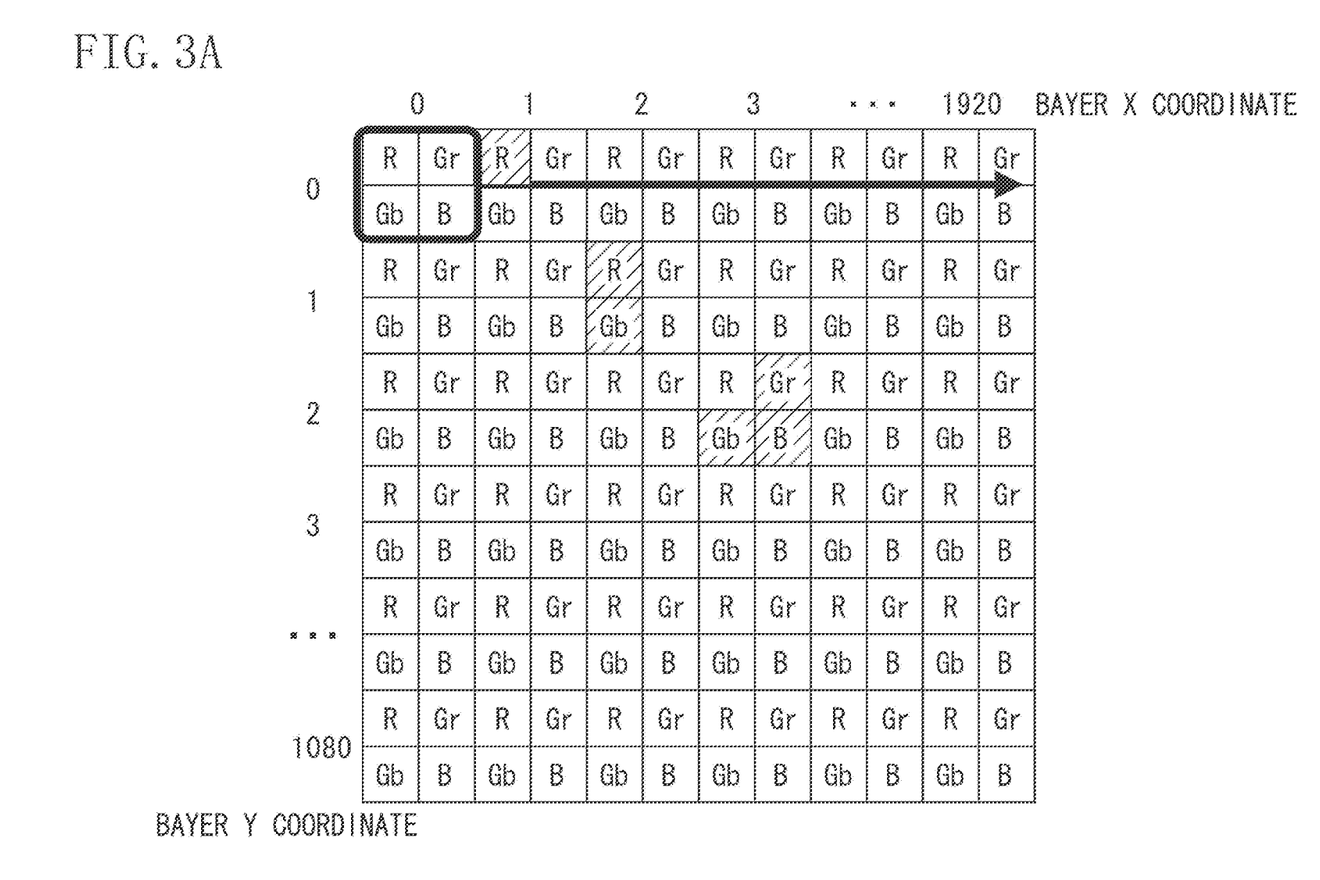
FIGS. 3A and 3B illustrate an example of an image and an example of defective pixel information, respectively.

FIG. 2 is a diagram illustrating a configuration example of the defect detection unit 200. The defect detection unit 200 includes a threshold comparison unit 201, a horizontal vertical counter unit 202, a detection enable generation unit 203, a write control unit 204, and the defective pixel information storage unit 205. An image to be input to the defect detection unit 200 will be described using FIG. 3A as an example. Assume that pixels illustrated in FIG. 3A are 3840 (W)×2160 (H) pixels, pixels filled in with gray are defective pixels, the defective pixels up to 8192 pixels at the maximum are present, and four pixels forming a Bayer pattern surrounded by a black thick frame are parallel and input image data in a raster scan order. This case will be described as an example.

The threshold comparison unit 201 determines whether input image data falls within a threshold range defined beforehand as a defective pixel, and outputs a defective pixel flag as 1 for a defective pixel, and as 0 for a non-defective pixel. The number of the threshold comparison units 201 is the same as the number of simultaneously input pixels of the input image data, and each of the threshold comparison units 201 executes processing in parallel. Using a vertical synchronizing signal (Vsync) and a horizontal synchronizing signal (Hsync), which are input synchronizing signals, the horizontal vertical counter unit 202 calculates X and Y Bayer coordinates that indicate the position of the current target Bayer pattern. The detection enable generation unit 203 generates a detection enable signal to be asserted for only one frame using a defect detection start signal to be asserted at an optional timing and the Vsync of the input synchronizing signal output from the control unit 106. The write control unit 204 obtains OR of bits of defective pixel flags output from the respective threshold comparison units 201, and executes AND operation of the result thereof and the detection enable signal, thereby generating a write enable signal for the defective pixel information storage unit 205. Further, the write control unit 204 initializes a write address to be output to the defective pixel information storage unit 205 to 0 when the head of a frame, i.e., the Vsync, is asserted. If the write enable signal becomes one, the write control unit 204 can write defective pixel information into the defective pixel information storage unit 205 in an input order of the input image data, by adding one to the value of the current write address. In this way, the write control unit 204 can implement write control with a simple circuit configuration, while parallel inputting of four pixels being executed.

Defective Pixel Information Storage Unit

Figure 3B:
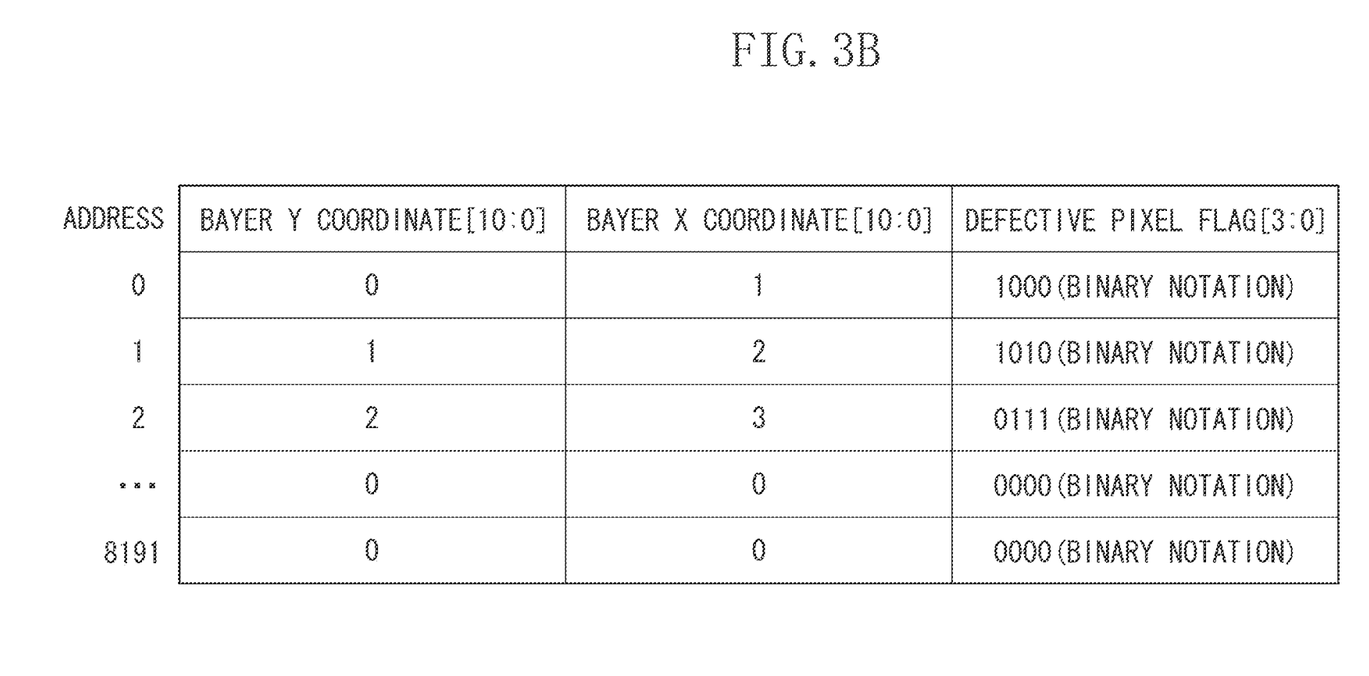

A data structure of the defective pixel information stored in the defective pixel information storage unit 205 includes a Bayer Y coordinate, a Bayer X coordinate, a defective pixel flag as illustrated in FIG. 3B. The data is arranged in an image input order. The Bayer coordinate is a coordinate for the unit of Bayer pattern, the Bayer coordinate is common to the four pixels (R/Gr/Gb/B), as illustrated in FIGS. 3A and 3B. Thus, X and Y coordinates can each be reduced by one bit, as compared with a coordinate in the unit of pixel. The defective pixel flag is a flag for identifying which pixel is a defective pixel, in the Bayer pattern indicated by the Bayer coordinates corresponding to the defective pixel flag. In FIG. 3B, 4 bits of the defective pixel flag correspond to R, Gr, Gb, and B in an order from the most significant bit (MSB), and each expresses a defective pixel when being one, and a non-defective pixel when being zero. For example, in a Bayer pattern indicated by (Bayer Y coordinate, Bayer X coordinate)=(2,3) in FIG. 3A, three pixels are defective pixels. However, this Bayer pattern is provided with a defective pixel flag as in data of an address 2 in FIG. 3B and therefore, it is not necessary to maintain the coordinates of the three pixels separately. Accordingly, the defective pixel information can be efficiently maintained. Assume that defective pixel information having a data structure including X and Y coordinates in the unit of pixel is stored in a separate storage unit for individual colors. In this case, the Y coordinate in the unit of pixel is represented with 12 bits, and the X coordinate in the unit of pixel is represented with 12 bits. Therefore, due to 24 bits per data, 8192 addresses, and four colors, a memory size of 24×8192×4=96 KBytes is used. In contrast, in the data structure described above, the Y coordinate in the unit of Bayer pattern is represented with 11 bits, the X coordinate in the unit of Bayer pattern is formed of 11 bits, and the defective pixel flag is represented with 4 bits. Therefore, due to 26 bits per data and 8192 addresses, the memory size can be reduced to a size of 26×8192=26 KBytes. Moreover, because the defective pixel information is collectively managed in the unit of Bayer pattern, it is not necessary to provide the write control unit 204 for each color, i.e., the only one write control unit 204 may be provided. Therefore, a circuit scale can also be reduced.

Figure 4:
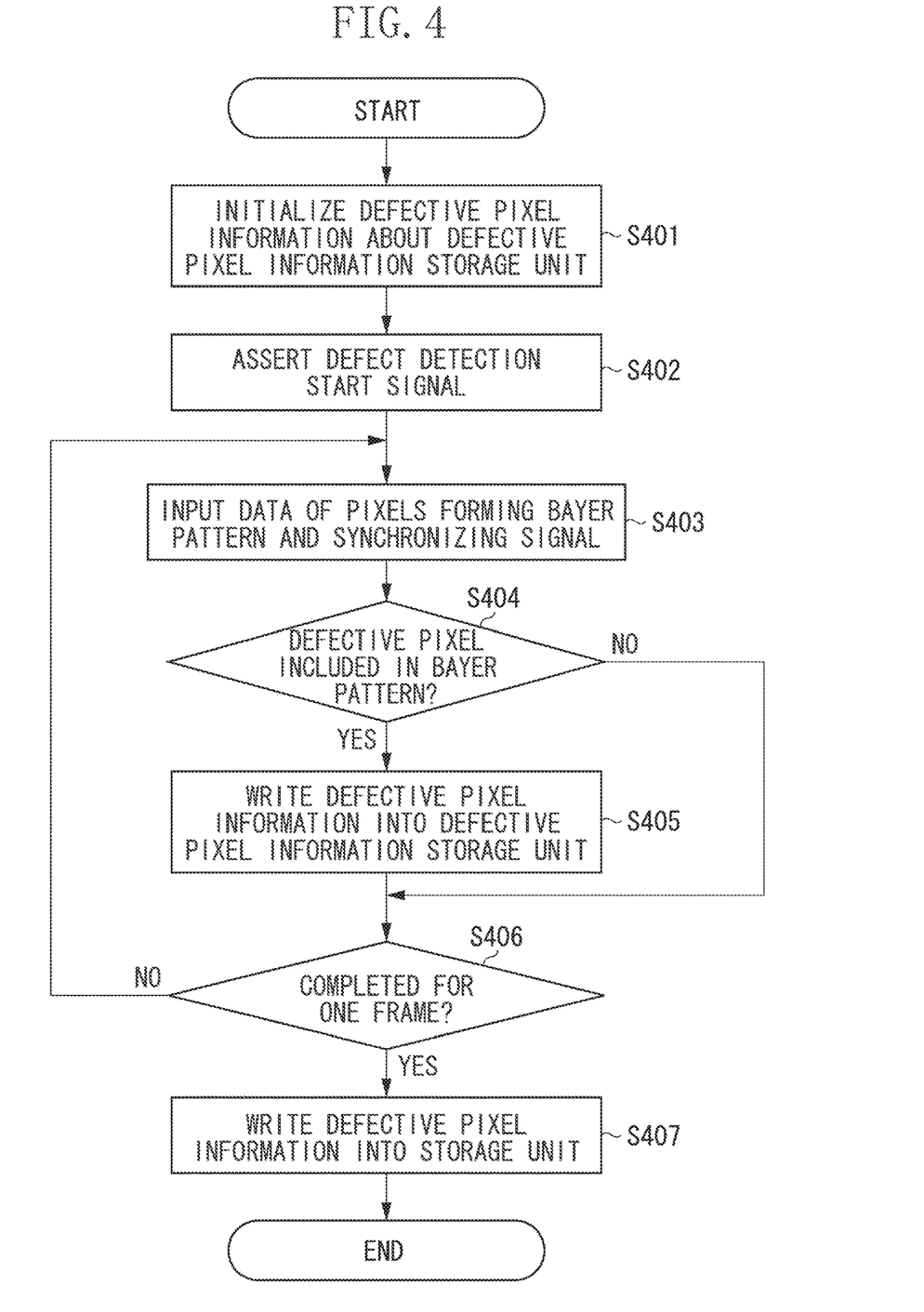
FIG. 4 is a flowchart illustrating an example of defect detection processing.

FIG. 4 is a flowchart illustrating an example of defect detection processing. In step S401, the control unit 106 initializes all data of the defective pixel information storage unit 205 to 0, based on an access command. This operation can prevent the previous defective pixel information from remaining at the end of the defective pixel information storage unit 205 in a case where the number of defective pixels detected the current time is less than the number of defective pixels detected the last time. In step S402, the control unit 106 asserts a defect detection start signal at an optional timing. The detection enable generation unit 203 generates a detection enable signal to be asserted for only one frame using a defect detection start signal and a Vsync of an input synchronizing signal. In only the one frame for which the detection enable signal is asserted, a defect detection result is effective. In step S403, the control unit 106 inputs four pixels (R/Gr/Gb/B) forming a Bayer pattern and a synchronizing signal. In step S404, the threshold comparison unit 201 determines, for each of the four pixels, whether the pixel is a defective pixel based on a threshold. If the threshold comparison unit 201 determines that none of the pixels is a defective pixel (No in step S404), the processing proceeds to step S406. If the threshold comparison unit 201 determines that one or more of the pixels are defective pixels (YES in step S404), the processing proceeds to step S405. In step S405, the write control unit 204 generates a write enable and a write address. The write control unit 204 then writes Bayer coordinates output from the horizontal vertical counter unit 202 and a defective pixel flag output from the threshold comparison unit 201, into the defective pixel information storage unit 205. When the writing is performed by the write control unit 204, the write address is incremented by one. In step S406, the control unit 106 determines whether the processing is completed for one frame. If the control unit 106 determines that the processing is completed for one frame (YES in step S406), the processing proceeds to step S407. If the control unit 106 determines that the processing is not completed for one frame (NO in step S406), the processing proceeds to step S403. In step S407, the control unit 106 writes the defective pixel information written in the defective pixel information storage unit 205, into the storage unit 105, which is a nonvolatile memory.

As described above, according to the present exemplary embodiment, it is possible to reduce the size of the memory of the defective pixel information storage unit 205, and to reduce the circuit scale without complication of the circuit configuration of the defect detection unit 200.

A second exemplary embodiment will be described below. In the first exemplary embodiment, a description will be provided concerning the reduction in the size of the memory of the defective pixel information storage unit 205 and the method for reducing the circuit scale in the defect detection processing. In the present exemplary embodiment, there will be described a method for reducing a circuit scale of defect correction processing by using the defective pixel information storage unit 205 described above.

Figure 5:
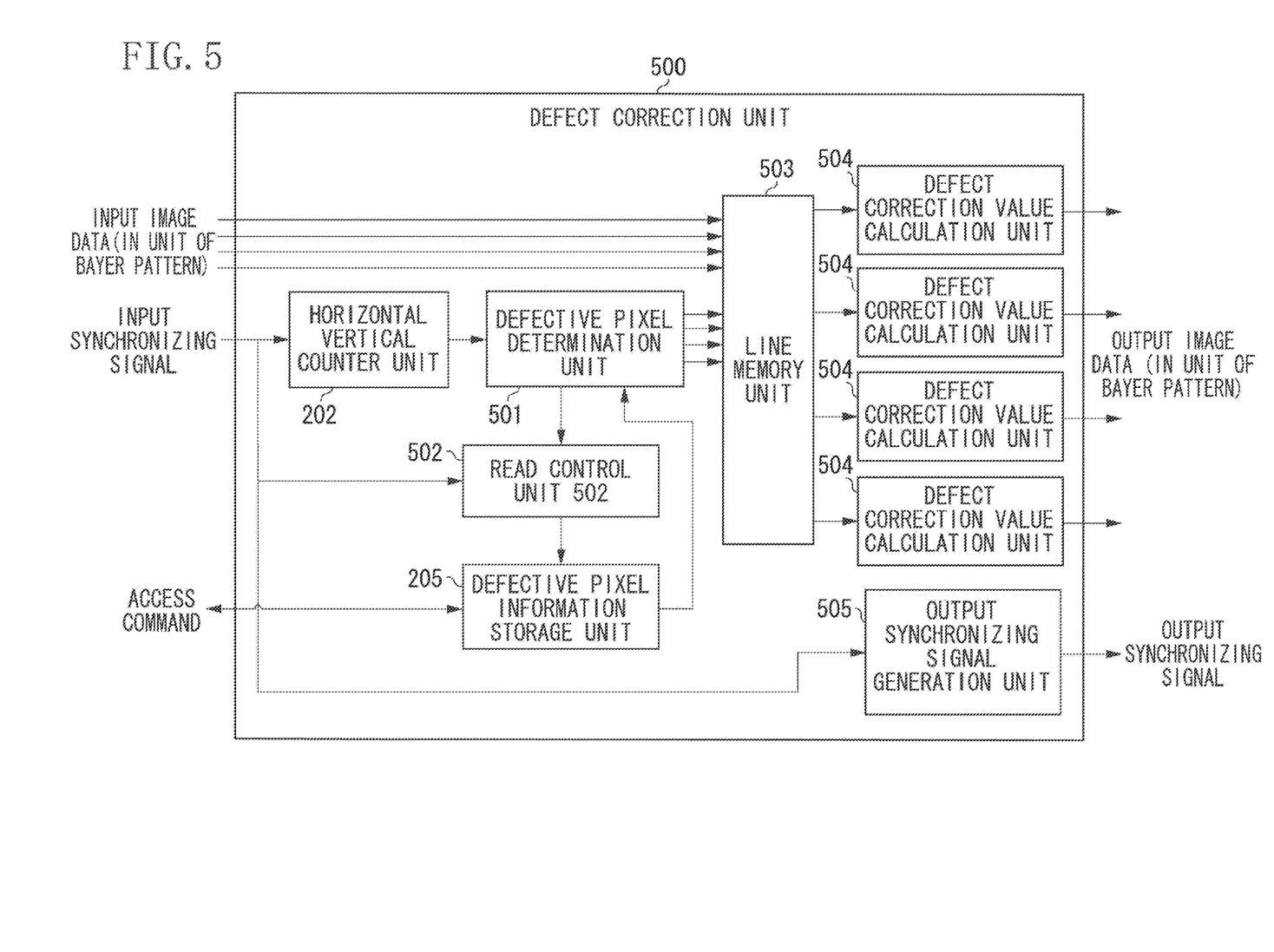
FIG. 5 is a diagram illustrating an example of a configuration of a defect correction unit.

FIG. 5 is a diagram illustrating a configuration example of the defect correction unit 500. The defect correction unit 500 includes the horizontal vertical counter unit 202, a defective pixel determination unit 501, a read control unit 502, the defective pixel information storage unit 205, a line memory unit 503, a defect correction value calculation unit 504, and an output synchronizing signal generation unit 505. The horizontal vertical counter unit 202 and the defective pixel information storage unit 205 are common to the defect detection unit 200.

The defective pixel determination unit 501 compares Bayer coordinates output from the horizontal vertical counter unit 202 and Bayer coordinates in defective pixel information output from the defective pixel information storage unit 205. If the Bayer coordinates do not match with each other, no defective pixel is included in the current target Bayer pattern. Thus, the defective pixel determination unit 501 sets a defective pixel enable signal for each color to 0, and outputs the defective pixel enable signal to the line memory unit 503. If the Bayer coordinates match with each other, a defective pixel is included in the current target Bayer. Thus, the defective pixel determination unit 501 sets the defective pixel enable signal to the value of a defective pixel flag in the defective pixel information, and outputs the defective pixel enable signal to the line memory unit 503. The defective pixel enable signal is provided for each color. The defective pixel enable signal indicates a defective pixel when being one, and a non-defective pixel when being zero.

Figure 6A:
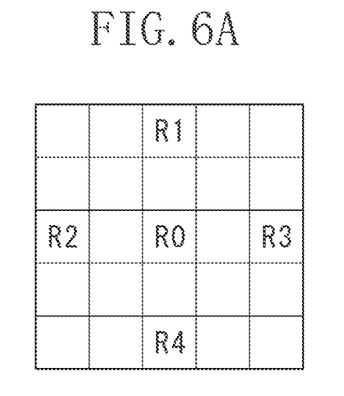
FIGS. 6A to 6C are diagrams illustrating calculation of a defect correction value.
Figure 6B:
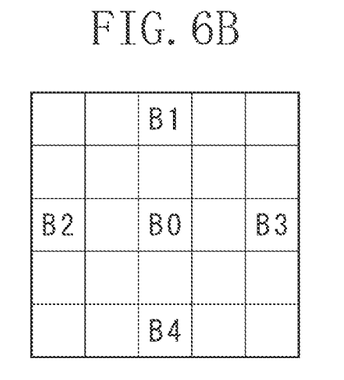
Figure 6C:
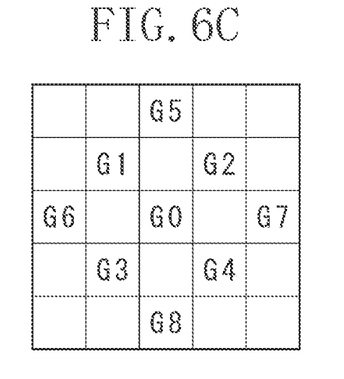

When the head of a frame, i.e., a Vsync, is asserted, the read control unit 502 initializes a read address to be output to the defective pixel information storage unit 205 to 0, and accesses the leading defective pixel information. Further, if the defective pixel determination unit 501 determines that a defective pixel is present, the read control unit 502 accesses the next defective pixel information, by adding one to the current read address. The control unit 106 issues an access command when the imaging apparatus is activated, and thus the defective pixel information about the storage unit 105 is written into the defective pixel information storage unit 205. The defective pixel information storage unit 205 outputs the defective pixel information about the read address output from the read control unit 502, to the defective pixel determination unit 501. The line memory unit 503 stores the input image data to be input to the defect correction unit 500 and the defective pixel enable signal to be output from the defective pixel determination unit 501, into a line buffer. The line memory unit 503 synchronizes data in a block of 5×5 pixels, and outputs the data to the defect correction value calculation unit 504. For convenience of description, the block of 5×5 pixels is used, but other block size may be used. The defect correction value calculation unit 504 is provided for each color. The defect correction value calculation unit 504 calculates a defect correction value by using the input image data for 5×5 pixels and the defective pixel enable signal output from the line memory unit 503. In a case where the defective pixel enable signal of the center pixel of the block is 0 (a non-defective pixel), the defect correction value calculation unit 504 directly outputs the center pixel of the block output from the line memory unit 503. In a case where the defective pixel enable signal of the center pixel of the block is 1 (a defective pixel), the defect correction value calculation unit 504 calculates a defect correction value by using pixels at pixel positions illustrated in FIGS. 6A to 6C. In a case where the center pixel is R (R0), the defect correction value calculation unit 504 calculates an average value of pixels corresponding to the defective pixel enable signal of 0 among pixels R1 to R4 illustrated in FIG. 6A, and replaces the pixel R0 with the calculated average value. In a case where the center pixel is B (B0), the defect correction value calculation unit 504 performs processing similar to processing performed for the R pixel, as illustrated in FIG. 6B. In a case where the center pixel is Gr or Gb (G0), the defect correction value calculation unit 504 calculates an average value of pixels corresponding to the defective pixel enable signal of zero among pixels G1 to G8 illustrated in FIG. 6C, and replaces the pixel G0 with the calculated average value. The method for calculating the defect correction value is not limited to the example described above. For example, the defect correction value calculation unit 504 may select pixels to be used for the calculation of the average value, in such a manner that the number of the pixels to be selected is a power of 2. Furthermore, for example, the defect correction value calculation unit 504 may use pixels of different colors. The output synchronizing signal generation unit 505 delays a synchronizing signal and outputs the delayed signal, in time with output of the image data from the defect correction value calculation unit 504.

Circuit Scale Reduction Owing to Data Structure of Defective Pixel Information Storage Unit The defective pixel determination unit 501 compares the Bayer coordinates of the horizontal vertical counter unit 202 and the Bayer coordinates in the defective pixel information in the defective pixel information storage unit 205. This can achieve the commonality of the coordinate determination in the unit of Bayer, thus eliminating the need to perform the coordinate determination for each color. Accordingly, the circuit scale can be reduced. In a case where the coordinates match with each other, the Bayer currently input to the defect correction unit 500 includes a defective pixel. Thus, the defective pixel determination unit 501 sets the defective pixel enable signal to the value of the defective pixel flag in the defective pixel information, and outputs the resultant. Which pixel in the Bayer is a defective pixel can be readily determined with a simple circuit configuration through such processing. In addition, because the defective pixel information is managed collectively, it is not necessary to provide the read control unit 502 and the defective pixel information storage unit 205 for each color, i.e., each of these units may be one. Thus, the circuit scale can be reduced.

Figure 7:
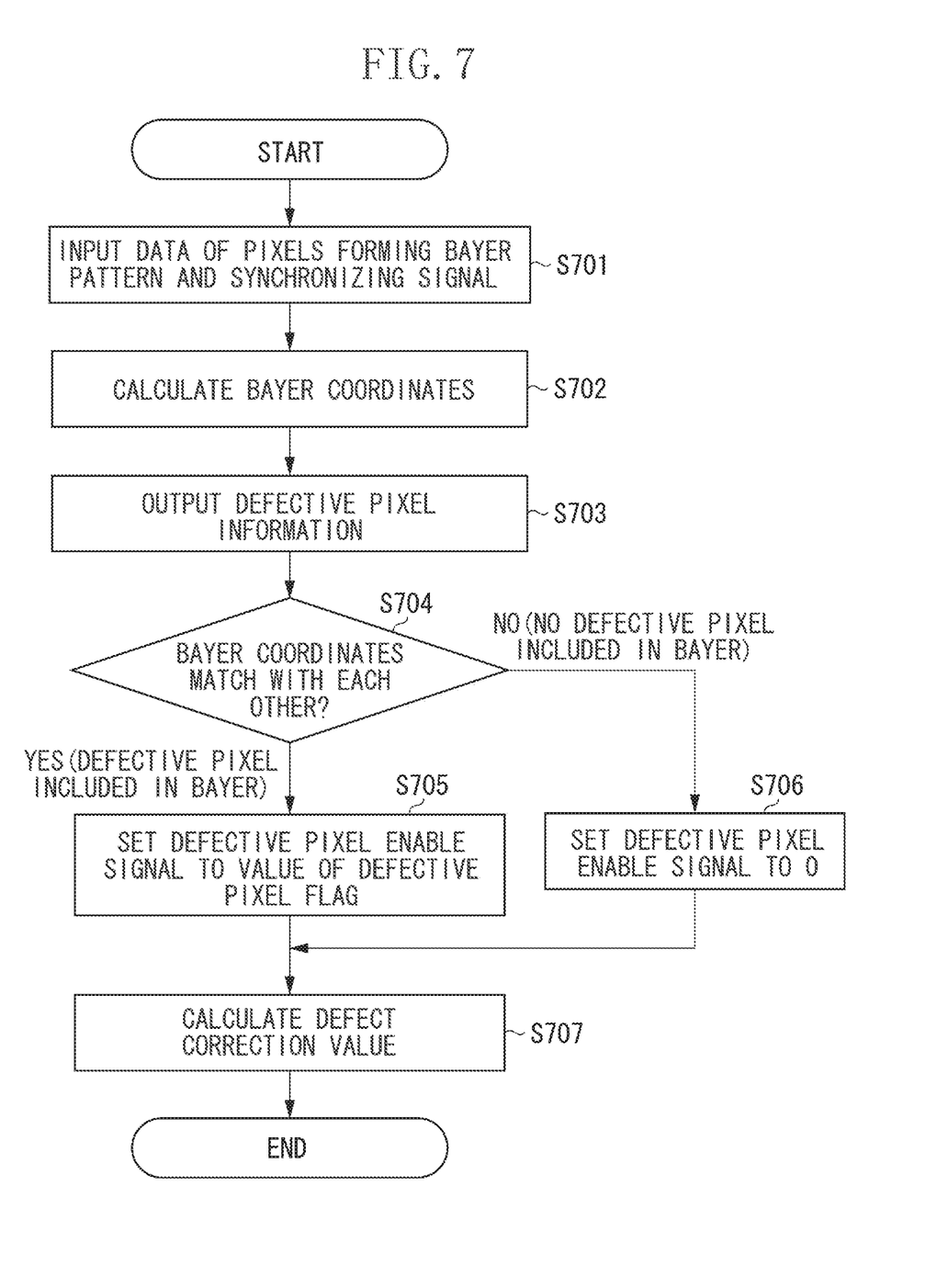
FIG. 7 is a flowchart illustrating an example of defect correction processing.

FIG. 7 is a flowchart illustrating an example of defect correction processing. In step S701, the control unit 106 inputs data of four pixels (R/Gr/Gb/B) forming a Bayer pattern and a synchronizing signal as a unit of the four pixels to the defect correction unit 500. In step S702, the horizontal vertical counter unit 202 calculates X and Y Bayer coordinates of the currently input data by using the synchronizing signal. In step S703, the defective pixel information storage unit 205 outputs defective pixel information about a read address output from the read control unit 502 to the defective pixel determination unit 501. The read address is initialized to zero at the head of a frame. In a case where the defective pixel determination unit 501 determines that a defective pixel is present, the value of the current read address is added by one. In step S704, the defective pixel determination unit 501 compares Bayer coordinates output from the horizontal vertical counter unit 202, and Bayer coordinates in the defective pixel information output from the defective pixel information storage unit 205. If the defective pixel determination unit 501 determines that the Bayer coordinates match with each other (YES in step S704), the processing proceeds to step S705. If the defective pixel determination unit 501 determines that the Bayer coordinates do not match with each other (NO in step S704), the processing proceeds to step S706. In step S705, the defective pixel determination unit 501 sets a defective pixel enable signal to the value of a defective pixel flag, and outputs the resultant to the line memory unit 503. In step S706, because no defective pixel is included in the current target Bayer, the defective pixel determination unit 501 sets a defective pixel enable signal for each color to 0, and outputs the resultant to the line memory unit 503. In step S707, the defect correction value calculation unit 504 calculates a defect correction value based on the input image data and the defective pixel enable signal output from the line memory unit 503, and replaces the defective pixel with the calculated defect correction value to output image data.

As described above, according to the present exemplary embodiment, the reduction of the circuit scale of the defect correction unit 500 can also be achieved using the defective pixel information storage unit 205 having the reduced memory size.

A third exemplary embodiment will be described below. In the present exemplary embodiment, there will be described an example of a case where the above-described configurations of the exemplary embodiments are applied to a head mounted display (HMD).

Figure 8:
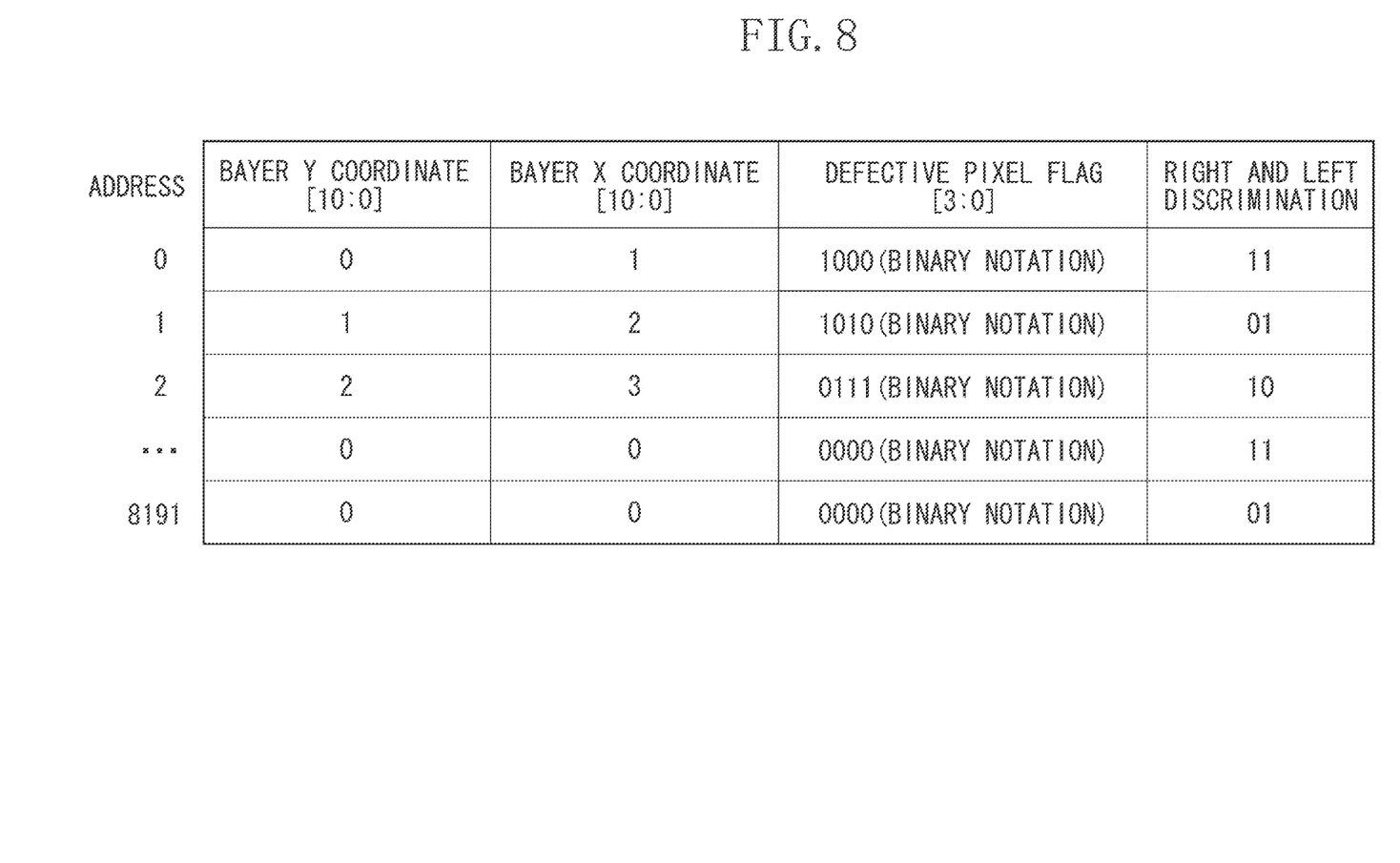
FIG. 8 is a diagram illustrating an example of defective pixel information.

In the case where the above-described configurations of the exemplary embodiments are applied to the HMD, components, such as a lens and an imaging element, are used for each of the right and left eyes. Further, the defective pixel information storage unit is also used for each of the right and left eyes. In the present exemplary embodiment, defective pixel information illustrated in FIG. 8 is used. Thus, defective pixel information related to the imaging element for the left eye and defective pixel information related to the imaging element for the right eye can be stored and managed in the defective pixel information stored in the one defective pixel information storage unit. As a result, a reduction in memory size and a reduction in circuit scale can be both achieved. In the configuration of the defective pixel information illustrated in FIG. 8, an item for right and left discrimination is added, as compared with the configuration of the defective pixel information illustrated in FIG. 3B. For example, a value 11 in the item of the right and left discrimination indicates that both the right and the left are relevant. A value 01 indicates that only the right eye is relevant, and a value 10 indicates that only the left eye is relevant.

Other Exemplary Embodiments

In the disclosure, a program for implementing one or more functions of the above-described exemplary embodiments is supplied to a system or apparatus via a network or storage medium. One or more processors in a computer of the system or apparatus read the program and then execute the read program, thus implementing the exemplary embodiments of the disclosure. Moreover, the exemplary embodiments of the disclosure can also be implemented by a circuit (e.g., an application-specific integrated circuit (ASIC)) for implementing one or more functions.

The exemplary embodiments of the disclosure are each described in detail above as an example, but the disclosure is not limited to such specific exemplary embodiments.

As described above, according to the configuration of each of the exemplary embodiments described above, a reduction in size of a memory for storing defect information and a reduction in circuit scale can be both achieved with a simple configuration.

According to the aspect of the embodiments, a reduction in size of a memory for storing defect information and a reduction in circuit scale can be both achieved with a simple configuration.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-052547, filed Mar. 17, 2017, which is hereby incorporated by reference herein in its entirety.

What is claimed is:

1. An apparatus comprising:
    two imaging elements corresponding to a left eye and a right eye of a user who wears the apparatus on the head;
    a storage unit configured to store defective-pixel related information that is information about a group of a plurality of pixels including one or more defective pixels among groups forming the image;
    at least one processor; and
    a memory coupled to the at least one processor, the memory having instructions that, when executed by the at least one processor performs operations as:
    a readout unit configured to read out the defective-pixel related information from the storage unit;
    a determination unit configured to compare coordinates of a counter unit and coordinates in the defective-pixel related information for a comparison result; and
    a correction unit configured to correct a defective pixel among a plurality of pixels forming each image imaged by the two imaging elements based on the comparison result,
    wherein the defective-pixel related information includes information that represents a position, of each of groups including one or more defective pixels, in an image imaged by each of the two imaging elements, and information that represents position of the one or more defective pixels in the groups.

2. The apparatus according to claim 1, further comprising a determination unit configured to determine whether a defective pixel is included, in the plurality of pixels forming each image imaged by the imaging element in the units, based on the defective-pixel related information,
    wherein, in a case where the defective pixel is included in the plurality of pixels, the correction unit corrects the defective pixel.

3. The apparatus according to claim 1, further comprising a writing unit configured to write the defective-pixel related information into the storage unit.

4. The apparatus according to claim 1, wherein the information that represents position of the unit of the plurality of pixels in the image is represented by coordinates defined based on the size of the group, and the information that represents position of one or more defective-pixels in the unit of the plurality of pixels is a set of flags for identifying which pixel is a defective-pixel.

5. The apparatus according to claim 4, wherein the information that represents position of the group of the plurality of pixels in the image is a coordinate in a case where the group of the plurality of pixels is treated as a unit with respect to at least one of a horizontal direction and a vertical direction of an image to be imaged by the image element, and the information that represents position of one or more defective-pixels in the unit of the plurality of pixels is information for identifying a defective pixel among the plurality of pixels.

6. The apparatus according to claim 4, wherein each of the flags is a signal indicating whether a corresponding one of the plurality of pixels is a defective pixel.

7. The apparatus according to claim 1, wherein the apparatus is to be used while being mounted on a head of a user.

8. The apparatus according to claim 1, wherein the group of the plurality of pixels is a pixel group of a multiple of a Bayer pattern.

9. The apparatus according to claim 1, wherein the group of the plurality of pixels is a pixel group forming a Bayer pattern.

10. The apparatus according to claim 1, wherein the defective-pixel related information is stored in an image input order in the storage unit.

11. An apparatus for reading data about a plurality of pixels as a unit, the apparatus comprising:
    a storage unit configured to store defective-pixel related information in the unit of the plurality of pixels;
    at least one processor; and
    a memory coupled to the at least one processor, the memory having instructions that, when executed by the at least one processor, perform operations as:
    a readout unit configured to read out the defective-pixel related information;
    a determination unit configured to compare coordinates of a counter unit and coordinates in the defective-pixel related information for a comparison result; and
    a correction unit configured to correct a defective pixel among the plurality of pixels based on the comparison result;
    wherein the apparatus is to be used while being mounted on a head of a user, and includes an imaging element corresponding to each of a left eye and a right eye of the user, and
    wherein the defective-pixel related information includes information for distinguishing between a pixel related to the imaging element corresponding to the left eye, and a pixel related to the imaging element corresponding to the right eye.

12. A method in an apparatus for reading data of an image imaged by an imaging element in units, groups of a plurality of pixels, the method comprising:
    storing defective-pixel related information that is information about a group of a plurality of pixels including one or more defective pixels among groups forming the image in a storage unit;
    reading out the defective-pixel related information from the storage unit;
    comparing coordinates of a counter unit and coordinates in the defective-pixel related information for a comparison result; and
    correcting a defective pixel among a plurality of pixels forming each image imaged by two imaging elements based on the comparison result, the two imaging element corresponding to a left eye and a right eye of a user who wears the apparatus on the head,
    wherein the defective-pixel related information includes information that represents a position, of each of groups including one or more defective pixels, in an image imaged by each of the two imaging elements, and information that represents position of the one or more defective pixels in the groups.

13. The method according to claim 12, further comprising determining whether a defective pixel is included in the plurality of pixels forming each image imaged by the imaging element in the units based on the read-out defective-pixel related information,
wherein, in a case where the defective pixel is included in the plurality of pixels, the defective pixel is corrected.

14. The method according to claim 12, further comprising writing the defective-pixel related information into the storage unit.

15. The method according to claim 12, wherein the information that represents position of the unit of the plurality of pixels in the image is represented by coordinates defined based on the size of the group, and the information that represents position of one or more defective-pixels in the unit of the plurality of pixels is a set of flags for identifying which pixel is a defective-pixel.

16. The method according to claim 15, wherein the information that represents position of the group of the plurality of pixels in the image is a coordinate in a case where the group of the plurality of pixels is treated as the unit with respect to at least one of a horizontal direction and a vertical direction of an image to be imaged by the imaging element, and the information that represents position of one or more defective-pixels in the unit of the plurality of pixels is information for identifying a defective pixel among the plurality of pixels.

17. The method according to claim 12, wherein the defective-pixel related information is stored in an image input order in the storage unit.

18. A method of an apparatus for reading data about a plurality of pixels as a unit, the method comprising:
storing defective-pixel related information in the unit of the plurality of pixels;
reading out the defective-pixel related information;
comparing coordinates of a counter unit and coordinates in the defective-pixel related information for a comparison result; and
correcting a defective pixel among the plurality of pixels based on the comparison result,
wherein the apparatus is to be used while being mounted on a head of a user, and includes an imaging element corresponding to each of a left eye and a right eye of the user, and
wherein the defective-pixel related information includes information for distinguishing between a pixel related to the imaging element corresponding to the left eye, and a pixel related to the imaging element corresponding to the right eye.

* * * * *